Figure 3:
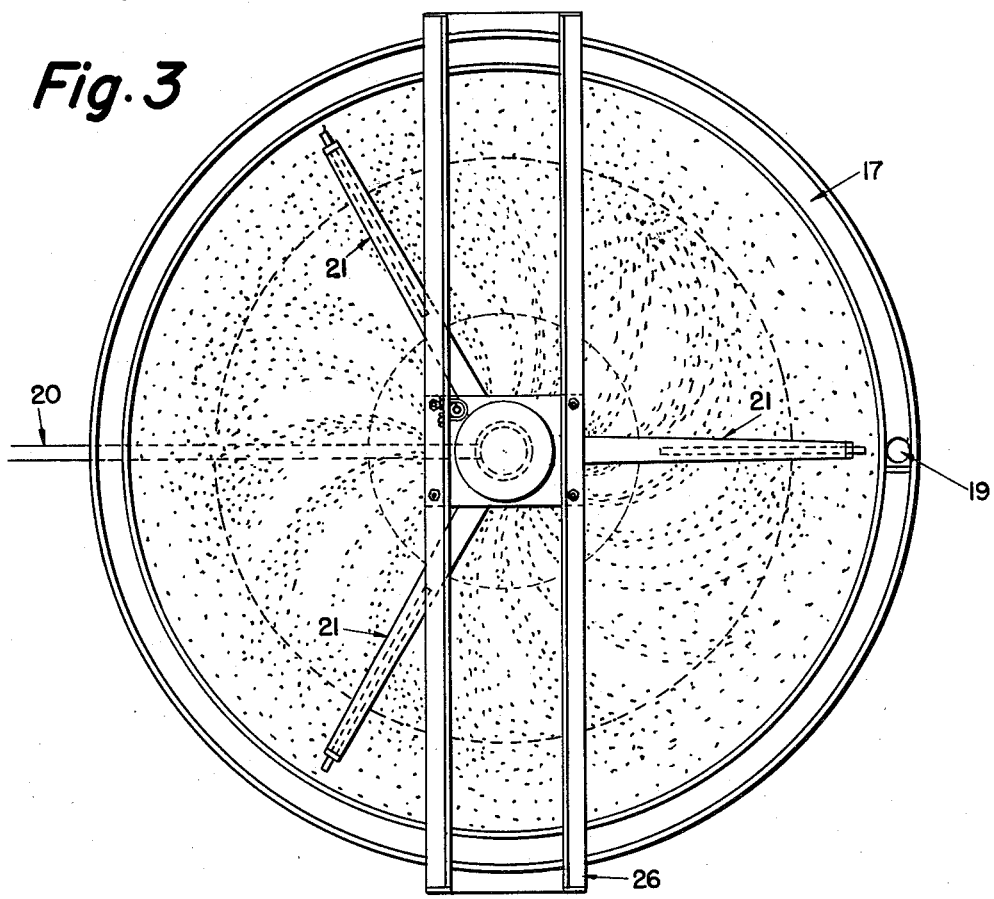

July 12, 1960 M. J. POWELL ET AL 2,944,986
APPARATUS FOR FORMING SPHERICAL MASSES
Filed April 11, 1956 2 Sheets-Sheet 1

Fig. 1

INVENTORS
MANLY J. POWELL
TOM A. CECIL
BY
ATTORNEY

July 12, 1960     M. J. POWELL ET AL     2,944,986
APPARATUS FOR FORMING SPHERICAL MASSES
Filed April 11, 1956     2 Sheets-Sheet 2

INVENTORS
MANLY J. POWELL
TOM A. CECIL
BY
ATTORNEY

United States Patent Office 2,944,986
Patented July 12, 1960

---

2,944,986

APPARATUS FOR FORMING SPHERICAL MASSES

Manly J. Powell, South Plainfield, and Tom A. Cecil, Highland Park, N.J., assignors to Minerals & Chemicals Corporation of America, Menlo Park, N.J., a corporation of Maryland Filed Apr. 11, 1956, Ser. No. 577,610

8 Claims. (Cl. 252—359)

The present invention relates to an apparatus and a process for forming spherical masses from solids containing liquids such as, for example, slurries of finely divided solid material or solutions of solid materials. The apparatus and process are especially useful for forming solid spherical masses, which are subsequently to be employed as adsorptive contact masses, from aqueous slurries of acid-reacted clays and particularly from such slurries of the reaction products of kaolin clays and sulfuric acid. The term spherical, as used herein, is intended to include within its meaning not only those shapes which are truly spherical but also shapes which approach spherical as, for example, those which are sometimes referred to as spheroidal.

A copending U.S. patent application, Serial No. 566,768, filed February 21, 1956, now U.S. Patent No. 2,898,304, by the present applicants, discloses a novel method of producing hard spherical adsorptive contact masses from naturally occurring clays, particularly kaolin clays. Briefly the method of said copending application comprises mixing sulfuric acid with the clay and aging the resulting mixture under such conditions of time and temperature as to effect substantial reaction between the clay and the acid; dispersing an aqueous slurry of the reacted clay-acid mixture in a hot organic liquid which is substantially nonreactive with sulfuric acid, as, for example, a white mineral oil, to form spherical masses therein; and calcining the spherical masses at a temperature sufficiently high to substantially decompose the aluminum sulfate formed during the reaction, thereby converting said masses to high quality adsorptive contact materials. The spherical masses produced by this method are particularly suitable as hydrocarbon conversion catalysts although they may also be useful as adsorbents for decolorizing vegetable and mineral oils and for various other purposes. As pointed out in the above-identified copending patent application, dispersion of the acid-treated clay slurries in hot organic liquids, of the type indicated, accomplishes the formation and drying of spherical masses from the said slurries, which masses are of unexpected hardness after calcination. Good hardness is, of course, required in adsorptive contact masses so as to minimize breakdown in use. Hereinafter, for simplicity's sake, the aforesaid method of forming spherical masses by dispersion of a solids containing liquid in a hot organic liquid will be referred to as "oil forming."

Although it was found possible to obtain dry spherical masses from the aforesaid acid-treated clay slurries by means of conventional spray drying in a gaseous drying medium, such masses were found to be much softer, after calcination, than were the corresponding masses formed in accordance with the aforesaid novel oil forming process. The reasons for the superiority of oil forming over conventional spray drying, insofar as hardness of final product is concerned, are not clearly understood. Suffice it to say that the oil forming procedure apparently provides a unique drying atmosphere for the slurry droplets whereby the water is removed therefrom without damage to the hardness of the solid residue remaining, such as apparently occurs when driving off water from the droplets in the gaseous atmosphere of a conventional spray drier.

The apparatus and process of the present invention are especially suitable for carrying out the oil forming step of the afore-mentioned copending patent application.

We are fully aware of the prior art disclosures of the formation of hydrogel "beads" or other spherical hydrogel masses, useful as hydrocarbon cracking catalysts after further drying, from hydrosols of various sorts (mostly synthetic silica or synthetic silica-alumina hydrosols) through dispersion thereof in organic liquids which are either immiscible or only partially miscible with water. In these prior art methods of forming hydrogel spheres from hydrosols by dispersion of the latter in organic liquids, the methods of dispersion have been accomplished principally by discharging a stream or spray of the said hydrosol into a quiescent bath of the organic liquid and allowing time for gelation of the resulting hydrosol spheres to take place in the liquid bath before removal of the said spheres therefrom. The oil forming step of the aforesaid copending patent application differs from the above-described prior art "oil gelation" procedure since in the former case the spheres are dried in a hot organic liquid whereas in the latter case they are merely solidified in the organic liquid through the process of gelation.

Although, as explained, the oil forming operation and the prior art "oil gelation" of hydrosols represent fundamentally different mechanisms, techniques suggested by the prior art "oil gelation" disclosures, such as dropping or spraying aqueous slurries of acid-treated clays into quiescent pools of organic liquids, could be used to oil form the spherical masses of the copending patent application; however, these techniques were found to be rather unsatisfactory from the standpoint of economics. For example, when oil forming spheres by dropping an aqueous slurry of acid-treated kaolin into a pool of suitably heated organic liquid, the procedure is slow and an inordinately large pool of liquid, as well as an excessively large number of dropping means, is required if sufficient capacity is to be achieved. Spraying the slurry into the liquid, as for example from a rotating disk or atomizer wheel of the type used in conventional spray driers, is perhaps a better method of oil forming spheres than the aforesaid dropping procedure, but here again a large pool of liquid is required, in this case because of the extensive area covered by the spray pattern.

It was primarily to obviate the above-mentioned difficulties that the apparatus and process of the present invention were conceived as a means of accomplishing the oil forming of dried spherical masses from acid-treated clay slurries. As will be clear from the complete description thereof which follows hereinafter, the apparatus and process of the present invention provide an improved means for accomplishing the oil forming of spherical masses whereby relatively high capacities can be achieved using comparatively small quantities of oil. The said apparatus is of fairly simple construction and, briefly, it effects its economy of oil consumption through creation of a vortex of oil into which the slurry can be sprayed or otherwise discharged. By "vortex of oil" and similar expressions, as used herein, is meant not only a body of liquid, having a swirling or circular motion tending to form a cavity in the center of the circle, but also a swirling layer of liquid such as would be formed by injection of a liquid under sufficient pressure tangentially into a vertically disposed vessel of circular transverse cross-section and having inwardly and downwardly converging sides. For continuous operation, the size and/or position at the vortex can be so adjusted that the oil continualy overflows its containing means at the outer periphery of the said vortex, carrying spherical masses, which have been borne outward by the current. In using the apparatus and process of our invention for oil forming spherical masses from acid-treated clay slurries, the slurries are sprayed, preferably from a rotating disk or atomizer wheel, directly into the liquid vortex walls from a position preferably below the outer edge of the vortex. Thus, the sprayed slurry contacts the hot oil after moving only a fraction of the distance (from the disk or wheel) through which it would travel if sprayed onto the horizontal surface of a quiescent pool of hot oil. It follows, therefore, that a much smaller body of oil will suffice when oil forming by means of our new apparatus and process than when oil forming by merely spraying onto a quiescent body of oil. When operating our new apparatus in a continuous fashion therein the swirling of the oil in the walls of the vortex continually transports the spherical masses formed from the sprayed slurry away from the area of impingement of the spray onto the said vortex walls. This feature, whereby, new oil is constantly replacing that which has received a burden of slurry spray, contributes to the oil economy effected by our new apparatus and process besides making it possible to operate our apparatus other than in a batch-wise fashion.

Although, as pointed out above, the apparatus and process of our present invention were conceived particularly to furnish a more economical means of carrying out oil forming as taught in the previously identified copending application, we wish to emphasize that the said apparatus and process is not limited to such usage. The apparatus and process can obviously be used to disperse any suitable liquid solution or slurry into any other liquid or liquid system, which is either immiscible or only partially miscible therewith, whereby discrete solid masses are produced upon contact of the two liquid systems. Thus, the apparatus and process can be used to accomplish the dispersion of an aqueous solution of a soluble salt, as for example aluminum sulfate, in a hot organic liquid to produce discrete spherical particles of the dried salt. The apparatus and process can also be utilized as an improved means for producing the hydrogel spheres of the prior art. The term "solids containing liquid" as used herein is intended to include not only slurries but also solutions and mixtures thereof.

Thus it is a principal object of the present invention to furnish a commercially practicable apparatus and process for dispersing aqueous slurries of acid-treated clays in hot organic liquids to thereby form dried solid particles of spherical form which are intended for ultimate use as adsorptive contact masses.

It is another object of the invention to furnish an improved apparatus and process for dispersing a solids containing liquid, such as a slurry or a solution, in a second body of a liquid, which is immiscible or only partially miscible therewith, to thereby form useful masses of a spherical form.

It is still another object of the invention to provide an apparatus for continuous economical operation which accomplishes dispersion of a solids containing liquid in a second body of a liquid, at least partially immiscible therewith, to thereby form useful masses of a spherical form.

Other objects and features of the invention will be readily apparent from the description thereof which follows.

Figure 4:
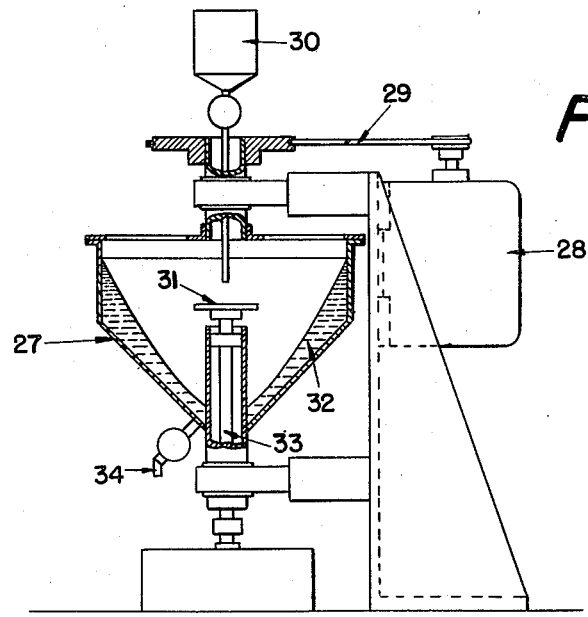

Referring to the drawings, Figure 1 depicts the flow diagram of a representative process employing our new apparatus, wherein the said apparatus is indicated by the numeral 1. Hereinafter, for simplicity's sake, our new apparatus will be designated as a "spray oil drier" although it is to be understood that the said apparatus need not necessarily employ an oil or effect drying of the spherical masses formed therein. Figure 2 is a vertical view of a preferred embodiment of our spray oil drier in operation partially in section to better show the working parts; Figure 3 is a top view of the operating spray oil drier of Figure 2; and Figure 4 is a vertical sectional view of another embodiment of our spray oil drier in operation.

Turning now to Figure 1, it is seen that the slurry to be sprayed in spray oil drier 1 is pumped from its containing vessel 2, by pump 3, to spray oil drier 1 wherein it is dispersed in an organic liquid (such as oil) as more fully described in connection with Figure 2. The overflow from spray oil drier 1 is conveyed to settling cone 4. The thickened underflow from settling cone 4 is passed to a separating device 5, such as a conventional dewatering screw, a filter or a centrifuge, for separating the solid spheres from the oil. The thickened underflow or cake from separating device 5 comprises the product from the operation. The overflow from separating device 5 is pumped to surge tank 6 from whence it is recirculated through heater 7 to spray oil drier 1 where it enters from the bottom and flows upward following the current in the vortex. By manipulation of valves 8 and 9, the flow of recirculating oil back to spray oil drier 1 can be controlled, part of it, if necessary, being short circuited into surge tank 6. Spherical masses which acccumulate in the bottom of spray oil drier 1 can be passed into separating device 5 through line 10. An alternate method of utilizing the equipment shown on Figure 1, as indicated by the dotted lines thereon, comprises passing the overflow from spray oil drier to surge tank 6; pumping the slurry from the bottom of surge tank 6 to cyclone separator 11; passing the thickened underflow from cyclone separator 11 to separating device 5 in which additional oil is separated from the spheres and returned to surge tank 6; passing the overflow from cyclone separator 11 through heater 7; and thence recirculating the heated oil to spray oil drier 1 or partly to spray oil drier 1 and partly to surge tank 6 as desired.

Figure 2, which is a cutaway vertical view of a preferred embodiment of our apparatus in operation, shows an aqueous slurry being fed to a rotating atomizer wheel 12 through feed line 13. The slurry is thrown substantially laterally from atomizer wheel 12 as a spray 14 into the swirling hot oil of vortex 15, in vessel 18. The spherical masses thus formed are carried to the outer edge of vortex 15 where they overflow with the oil as at 16 into launder 17. The water has been substantially vaporized from the spherical masses, by heat from the oil, before they reach and accompany the overflow of oil at 16 into launder 17. The slurry of spherical masses in oil is removed from the spray oil drier through drainpipe 19. Recirculating oil is fed into the bottom of vessel 18 through feed pipe 20 as shown. Three paddles 21, only one of which appears on Figure 2, create vortex 15 in the oil in vessel 18 by rotating on shaft 22 in plow-like fashion around the bottom of vessel 18, shaft 22 being driven through chain drive 23. Circular heating element 24 is for the purpose of keeping the oil in vessel 18 at the proper operating temperature either alone or in conjunction with a separate heater such as heater 7 on Figure 1. Drain 25 is supplied for the purpose of removing solids which accumulate in the bottom of vessel 18, as for example when operating in batch-wise fashion with the outer edge of the vortex below the rim of vessel 18 and therefore with no overflowing of oil with accompanying removal of solids from the system.

Figure 3 is a self-explanatory top view of the Figure 2 apparatus in operation. This drawing shows the relative positions of the three paddles 21 which rotate about a central axis to create the vortex in the oil. Figure 3 also shows a supporting structure 26 for atomizer wheel 12 and its driving means.

In Figure 4 there is shown an embodiment of our new apparatus in which the vortex is maintained in the oil by rotation of vessel 27. In this particular embodiment vessel 27 is rotatably mounted in position as shown and caused to rotate by motor 28, acting through V-belt 29. When the apparatus is operating slurry is fed from container 30 onto rotating disk 31 from whence it is thrown as a spray into vortex 32. Disk 31 is fastened to shaft 33 which is caused to rotate rapidly by driving means located below vessel 27. Solid spheres formed as a result of the operation can be removed from vessel 27 through bottom drain 34. By obvious modifications the apparatus can be altered to operate continuously with the spheres being removed in an overflow of oil from the top of vessel 27 in the manner shown in Figure 2.

It is to be understood of course, that the embodiments and functions shown in the attached drawings are to be considered as merely illustrative of our invention, to aid in a clear understanding thereof, and are not to be construed as limiting the invention to such embodiments and/or functions. There are numerous other embodiments and uses of our apparatus and process which fall within the spirit and scope of the invention. For example, as another embodiment, the vortex may be created by discharging the oil under pressure tangentially into the oil containing vessel.

As previously emphasized, the apparatus of our present invention is particularly suited for oil forming the spherical masses of our copending patent application Serial No. 566,768. This copending patent application, as explained hereinbefore, discloses a method of producing spherical absorptive contact masses from a clay, particularly a kaolin clay, through the steps of reacting the clay with sulfuric acid; dispersing an aqueous slurry of the reacted clay-acid mixture in a suitable hot organic liquid to form dried or partially dried spherical masses therein; and calcining the spherical masses to decompose aluminum sulfate and thereby convert them to the final product.

In practicing the process of our aforesaid copending application, the clay is first mixed with sulfuric acid to an appearance of homogeneity in any conventional mixer suitable for the purpose as, for example, a pug mill. While it is preferable to use degritted raw clay (that which has been refined only to the extent that grit, foreign bodies and clots of undispersed clay have been eliminated) as a starting material for the process, raw clays as mined or those which have received preliminary treatment other than merely degritting may also be used. The acid to be mixed with the clay should preferably be concentrated sulfuric acid, as for example the commercially available 66° Bé. (about 93 percent $H_2SO_4$) acid, but good results have been achieved with acid concentrations as low as 60 percent and as high as 98 percent. The preferred acid dosages for this process have been found to lie within the range from about 60 percent to about 150 percent, acid dosage being the weight of 100 percent acid per weight of volatile free clay expressed on a percentage basis. Volatile free clay weight corresponds to the weight of the clay remaining after it has been heated to essentially constant weight at about 1700° F. Although acid dosages much lower than 60 percent, down to as low as 20 percent in fact, have been used in the instant process, the clay conversion gradually falls off with decreasing dosage until ineffectual conversion levels are reached. Dosages higher than 150 percent can be used in the process if desired. Approximately 130 percent dosage represents the theoretical amount of acid that would be required for substantially complete reaction with the alumina of an average kaolin clay, assuming all of the acid reacted to form aluminum sulfate.

After the clay and acid have been mixed, the resulting mixture is aged under controlled conditions of time and temperature such that substantial reaction between the acid and the alumina in the clay is accomplished. It has been experimentally discovered that optimum temperatures of aging, at least in the case of kaolin clays, fall within the range from about 250° to about 500° F., and optimum times within the range from about 1 to about 30 hours.

After the clay-acid mixture has been properly aged it is dispersed in water to an aqueous slip, if necessary, since its further dispersion in the hot organic liquid to oil form the spherical masses therefrom requires it to be in the form of a slurry. The organic liquids suitable for use in this process, as previously stated, should be substantially non-reactive with sulfuric acid at the operating temperatures; these liquids should preferably have low vapor pressures at the operating temperatures but lower boiling liquids can be used in conjunction with condenser systems to prevent loss of vapors and to serve as a safety precaution. Hydocarbon liquids, particularly saturated aliphatic high molecular weight hydrocarbons which have been treated with sulfuric acid for removal of sulfonatable components therefrom, have been found especially suitable for "oil forming" in the instant process. While white mineral oil is our preferred hydrocarbon liquid for the process, kerosene and other more volatile oils can be employed therein, usually in conjunction with a condenser system. For best results the oil temperatures during dispersion of the clay-acid slurries should be within the range from about 275° to about 500° F.; obviously, temperatures and other operating conditions should be carefully maintained and controlled to avoid danger of ignition or vapors during operation.

When the preferred dosages and concentrations of sulfuric acid are used, the clay-acid mixture after aging is usually in the form of a hard mass which preferably is ground before being dispersed in water to yield a slurry capable of being dispersed in oil. The optimum solids content to which the slurry should be adjusted will vary with the particular conditions of operation; in this connection, it has been found that when an 80 percent dosage of concentrated sulfuric acid is used on an average kaolin clay, the solids content of an aqueous slurry made from the aged clay-acid mixture at room temperature can not substantially exceed about 22 or 23 percent (based on the volatile free weight of the starting clay) without extensive crystallization taking place therein. Crystallization is obviously undersirable in such a slurry since it causes it to thicken, or actually "set" into a hard mass, and thus renders it unsuitable for spraying or otherwise dispersing in oil. When the dosage of concentrated acid is 150 percent, the clay-acid slurry can not exceed about 17 percent solids at room temperature (volatile free clay basis) without extensive crystallization occurring. It is usually preferable, for economic reasons, to prepare as thick a slurry as possible for dispersing in the oil.

After the aqueous clay-acid slurry has been prepared it is dispersed in the hot oil, or other suitable organic liquid, where the individual droplets of the slurry quickly lose their water through evaporation leaving behind discrete spherical masses of solid material which are recovered from the oil and calcined for conversion to the final product. In accordance with our invention dispersion of the slurry in the hot oil is accomplished by means of our novel apparatus. Referring to Figure 2 which shows our preferred embodiment, slurry is fed to a rapidly rotating atomizer wheel from which it is thrown as a spray through openings around the periphery thereof, into the vortical walls of hot oil induced by the paddles in the apparatus. After the spray has entered the hot oil, the droplets thereof quickly lose water and the solid spheres remaining are conveyed to the top of the vortex, by the cyclone-like action of the said vortex, and over the top of vessel 18 with the overflow oil, into launder 17 encircling vessel 18. From here, the spheres dispersed in the oil are passed to some form of device for separating the spheres from the oil, the latter being recirculated to the system. Finally the spheres are calcined to convert them to the desired adsorptive product.

Our new apparatus and process are particularly useful for producing spherical masses of such size range as to be suitable for fluid hydrocarbon cracking catalyst purposes. A fluid cracking catalyst should preferably consist of particles within the size range minus-100-mesh, plus-325-mesh, but in any case with not more than about 20 percent of its weight made up of minus-325-mesh particles or more than 20 percent coarser than 200 mesh. Finely divided spherical particles such as these are conventionally referred to in the art as microspheres. The present apparatus is, of course, not limited to the production of spherical masses of microphere size since it can be used with minor modifications of its various elements and operating techniques to produce spheres of various other sizes.

Various means of spraying or otherwise discharging the slurry or other solids containing liquid into the liquid vortex formed in our apparatus can be used within the scope of our invention. For example nozzles or sprayheads of the types well known to those skilled in the art are suitable. We have found the wheel-type NERCO-NIRO Atomizer, made by Nichols Engineering and Research Corporation, to be particularly suitable for producing microspheres from clay-acid slurries in our apparatus. Rotational velocities of wheels or disks, as well as vortex creating means, will vary with the circumstances of the particular operation involved. However, the determination of such variables are merely a matter of routine experimentation as one skilled in the art will recognize.

The shape of the vessel 18 containing the liquid in which the vortex is created is immaterial so long as a vortex is attainable therein. Perhaps the most practical shape for commercial purposes is that shown in Figures 2 and 4 in which the main portion of vessel 18, is cylindrical and the bottom closure is in the form of an inverted cone. For purposes of conserving heat and preventing escape of vapor from the vessel into the surrounding air it is generally desirable to have a top closure on said liquid containing vessel. To effect removal of vaporized water from the vessel, the top closure can be vented to a stack or hood or to a condenser system for recovery of vapors of the oil or other liquid escaping from said vessel along with the water vapor.

Any well known heating means may be employed for maintaining the liquid in vessel 18 at the proper temperature level. For example, electrical heating elements 24 or flames may be applied to the bottom of said vessel to transmit the necessary heat to the liquid therein or separate heating means either alone or in conjunction with the above-mentioned elements can be employed.

We claim:

1. An apparatus for forming solid spherical masses from a solids containing liquid capable of yielding such masses upon dispersion thereof in a second liquid which is at least partially immiscible therewith, comprising a vertically disposed vessel of circular transverse cross-section, having a bottom closure formed by inwardly and downwardly converging sides, for containing said second liquid; rotating paddle means in said liquid containing vessel for causing the liquid therein to swirl and form a vortex; means for dispersing said solids containing liquid in said swirling liquid in said vessel to form solid spherical masses therein; and means for removing the solid spherical masses from said vessel.

2. An apparatus for continuously forming solid spherical masses from a solids containing liquid capable of yielding such masses upon dispersion thereof, in dropwise form, in a second liquid which is at least partially immiscible therewith, comprising: a vertically disposed vessel of circular transverse cross-section, having a bottom closure formed by inwardly and downwardly converging sides, for containing said separate liquid; rotating paddle means in the liquid containing vessel for causing the liquid therein to swirl and form a vortex of such dimensions that said liquid overflows the rim of said liquid containing vessel; means for discharging said solids containing liquid, dispersed in dropwise form, into the vortex of swirling liquid in said vessel to form solid microspheres therein of such size as to substantially accompany the liquid overflowing the rim of said liquid containing vessel; launder means disposed circumferentially around the outside rim of said liquid containing vessel to catch the overflow therefrom; drain means in said launder means for removal of liquid and microspheres therefrom; and inlet means in the bottom of the liquid containing vessel, to admit liquid to replace that which overflows the rim of said liquid containing vessel.

3. The apparatus of claim 2 in which the liquid containing vessel has drain means in the bottom.

4. The apparatus of claim 2 in which the means for discharging the solids containing liquid into the vortex of swirling liquid comprises an atomizer wheel rotatably and horizontally supported by a frame work over the liquid containing vessel in such fashion that said solids containing liquid can be fed thereinto from above, and means for causing the said atomizer wheel to rotate rapidly whereby it throws said solids containing liquid outward from its periphery into the walls of the liquid vortex after said solids containing liquid has been fed thereinto.

5. The apparatus of claim 2 in which the liquid containing vessel includes heating means adjacent the bottom for maintaining the liquid therein at desired temperature levels.

6. An apparatus for forming solid spherical masses from a solids containing liquid capable of yielding such masses upon dispersion thereof in a second liquid which is at least partially immiscible therewith, comprising: means for containing said second liquid; means for causing said second liquid to swirl and form a vortex; means for dispersing said solids containing liquid in said swirling liquid to form solid spherical masses therein; and means for removing the solid spherical masses from said containing means; said dispersing means comprising a horizontally disposed rotatable disk; means for causing the disk to rotate rapidly; and means for feeding the solids containing liquid onto the upper face of the disk as it rotates whereby said solids containing liquid may be thrown as a spray from said disk, by centrifugal force, into the liquid vortex walls.

7. An apparatus for forming solid spherical masses from a solids containing liquid capable of yielding such masses upon dispersion thereof in a second liquid which is at least partially immiscible therewith, comprising: means for containing said second liquid; means for causing said second liquid to swirl and form a vortex; means for dispersing said solids containing liquid in said swirling liquid to form solid spherical masses therein; and means for removing the solid spherical masses from said containing means; said dispersing means comprising an atomizer wheel rotatably and horizontally mounted in such fashion that said solids containing liquid can be fed thereinto; and means for causing the said atomizer wheel to rotate rapidly whereby the said solids containing liquid may be thrown outward from its periphery into the walls of the liquid vortex after said solids containing liquid has been fed into said atomizer wheel.

8. An apparatus for forming solid spherical masses from a solids containing liquid capable of yielding such masses upon dispersion thereof in a second liquid which is at least partially immiscible therewith, comprising: a vertically disposed, rotatably mounted vessel of circular transverse cross-section, having a bottom closure formed by inwardly and downwardly converging sides for containing said second liquid; means for rotating said vessel to cause the liquid therein to swirl and form a vortex; means for dispersing said solids containing liquid, in the swirling liquid in said vessel to form solid spherical masses therein; and means for removing the solid spherical masses from said vessel; said dispersing means comprising a horizontally disposed disk fixedly secured to the upper end of a rotatably mounted shaft passing downward through the bottom of the liquid containing vessel; means for causing the shaft to rotate rapidly; and means for feeding the solids containing liquid onto the upper face of the disk as it rotates with the shaft whereby said solids containing liquid may be thrown from the said disk by centrifugal force, as a spray, into the liquid vortex walls.

References Cited in the file of this patent

UNITED STATES PATENTS

| | | |
|---|---|---|
| 2,186,033 | Milton | Jan. 9, 1940 |
| 2,299,929 | Raynolds | Oct. 27, 1942 |
| 2,418,232 | Marisic | Apr. 1, 1947 |
| 2,446,784 | Daley et al. | Aug. 10, 1948 |
| 2,459,903 | Voorhees | Jan. 25, 1949 |
| 2,541,221 | Edwards | Feb. 13, 1951 |
| 2,553,213 | Runton | May 15, 1951 |
| 2,572,998 | Eisner | Oct. 30, 1951 |
| 2,698,815 | Bishop | Jan. 4, 1955 |